3,417,160
DIMERISATION PROCESS
James Keith Hambling, Frimley, near Aldershot, and John Robert Jones, Walton-on-Thames, England, assignors to The British Petroleum Company Limited, London, England, a British company
No Drawing. Filed Dec. 28, 1966, Ser. No. 605,195
8 Claims. (Cl. 260—683.15)

ABSTRACT OF THE DISCLOSURE

Olefin dimers are prepared by contacting an alpha olefin with a catalyst comprising a nickel acetyl actonate, aluminum dilthyl monochloride and a methylene halide at a temperature in the range —40° to +200° C. under such conditions of pressure that the reactants are maintained in the liquid or partially condensed phase.

---

This invention relates to a process for the production of dimers of alpha olefins.

Our copending United States application Ser. No. 558,588, filed June 20, 1966, discloses a process for the production of a product consisting predominantly of linear dimers having an internal double bond which process comprises dimerising an alpha olefin in the presence of a catalyst comprising a complex organic compound of a metal of Group VIII of the Periodic Table according to Mendeleef and an activating agent at a temperature in the range —40° C. to +200° C. under such conditions of pressure that the reactants are maintained in the liquid or partially condensed phase.

Alkyl aluminium halide compounds are not activating agents under the specified conditions.

We have now discovered that the presence of a methylene dihalide enables an alkyl aluminium halide compound to be employed as a component of a dimerisation catalyst.

Thus according to the present invention there is provided a process for the production of a product containing linear dimers having an internal double bond which process comprises dimerising an alpha olefin in the presence of a catalyst comprising a complex organic compound of a metal of Group VIII of the Periodic Table according to Mendeleef, an aluminium alkyl halide and a methylene halide, at a temperature in the range —40° C. to +200° C. under such conditions of pressure that the reactants are maintained in the liquid or partially condensed phase.

The preferred complex organic compound is nickel acetyl acetonate.

Preferably dimerisation is effected in the presence of the methylene halide as the sole solvent for the reaction.

Dimerisation may, however, if desired, be effected in the additional presence of an inert diluent. Suitable diluents include normally liquid saturated hydrocarbons and benzene.

The preferred aluminum alkyl halide is diethyl aluminium monochloride.

The preferred methylene halide is methylene chloride.

Preferably the molar ratio of the Group VIII compound to the aluminium alkyl halide is in the ratio 1:1 to 1:10.

Suitable olefins for dimerisation include those containing from 2–6 carbon atoms per molecule.

Preferred olefins are ethylene, propylene and butene-1.

Preferably the pressure under which dimerisation is effected is in the range 200–2000 p.s.i.g. for ethylene, propylene and butene-1.

Pressures as low as atmospheric may be used for the dimerisation of higher olefins, e.g. 3-methylpentene-1 and 4-methylpentene-1.

The catalyst must be preserved from contact with water, oxygen, alcohols, ethers, amines, phosphines, sulphur compounds, dienes, acetylenes, carbon monoxide and other complexing ligands which displace olefins from transition metal complexes and thereby poison the catalyst or inhibit polymerisation.

The product distribution is not quite the same as the product distribution in our copending application Ser. No. 558,588 in which linear dimers predominate, although the total yield of linear dimers is similar. In a process according to the present application total dimer product yields are higher but the proportion of linear dimer obtained is lower.

The invention is illustrated by the following examples.

EXAMPLE 1

It is to be understood that Example 1 is provided for purposes of comparison only and that operation as described with reference to Example 1 is not operation of a process in accordance with the scope of the present invention.

Nickel acetyl acetonate (2.0 g.) was slurried in purified cyclohexane (75 cc.) under reflux. Diethyl aluminium chloride (2.0 cc.) was added over 20 minutes. The mixture was cooled and transferred under nitrogen to a 1 litre rocking autoclave which was pressurised with propylene to 600 p.s.i.g. at 40° C. for 17¾ hours. The contents of the autoclave were vented off into cooled traps and after evaporation of the propylene the residue was distilled up to 80° C. Only a small amount of dark material, mainly reduced nickel and aluminium alkyls, remained undistilled. The distillate was shown by infra red spectrum and GLC analysis to be entirely cyclohexane with no trace of olefins.

EXAMPLE 2

Nickel acetyl acetonate (2.6 g.) was slurried in methylene dichloride at 0° C. while diethyl aluminium chloride (5.0 cc.) was added drop-wise over 15 minutes. The mixture was then heated under reflux for 30 minutes. It was then cooled and transferred under nitrogen to a 1 litre rocking autoclave. The autoclave was pressurized with propylene to 600 p.s.i.g. at 40° C. for 17 hours. The product was recovered as hereinbefore described with reference to Example 1. The product consisted of 116 g. hexenes, with only a small amount (less than 5 g.) of higher boiling polymer. The hexenes contained 31.0% linear hexenes. The catalyst activity was 11.5 g. polymer g. nickel/hour.

What we claim is:
1. A process for the production of a product containing a high proportion of linear dimers having an internal double bond which comprises dimerising an alpha monoolefin containing 2–6 carbon atoms per molecule in the presence of a catalyst comprising nickel acetyl acetonate, aluminium diethyl monochloride and a methylene halide at a temperature in the range —40 to +200° C. under such conditions of pressure that the reactants are maintained in the liquid or partially condensed phase.
2. A process according to claim 1 wherein dimerisation is effected in the presence of the methylene halide as the sole solvent for the reaction.

3. A process according to claim 1 wherein the methylene halide is methylene chloride.

4. A process according to claim 1 wherein the molar ratio of the nickel acetyl acetonate to the aluminium diethyl monochloride is in the ratio 1:1 to 1:10.

5. A process according to claim 1 wherein the alpha mono-olefin is selected from the group consisting of ethylene, propylene and butene-1

6. A process according to claim 5 wherein the pressure under which dimerisation is effected is in the range 200–2000 p.s.i.g.

7. A process according to claim 1 wherein the alpha olefin is selected from the group consisting of 3-methylpentene-1 and 4-methylpentene-1.

8. A process according to claim 7 wherein the pressure under which dimerisation is effected is atmospheric.

References Cited

UNITED STATES PATENTS

| 2,969,408 | 1/1961 | Nowlin et al. | 260–683.15 |
| 3,321,546 | 5/1967 | Roest et al. | 260—683.15 |

FOREIGN PATENTS 651,596  2/1965  Belgium.

PAUL M. COUGHLAN, Jr., *Primary Examiner.*

U.S. Cl. X.R.

252—431